I. Morris,

Work Stand.

No. 70,796.   Patented Apr. 14, 1868.

Witnesses
Guy C. Humphries
Chas. H. Herson.

Inventor
I. Morris
by
D. C. Sonues & Co
his Attorneys

United States Patent Office.

I. MORRIS, OF CLINTON, ILLINOIS.

Letters Patent No. 76,796, dated April 14, 1868.

IMPROVEMENT IN WORK-STANDS.

The Schedule referred to in these Letters Patent and making part of the same.

TO ALL WHOM IT MAY CONCERN:

Be it known that I, I. MORRIS, of Clinton, in the county of De Witt, and in the State of Illinois, have invented a new and useful Combined Spool-Rack, Pin-Cushion, and Twine-Box; and I do hereby declare that the following is a full, clear, and exact description thereof, reference being had to the annexed drawings, making part of this specification, in which—

Figure 1:
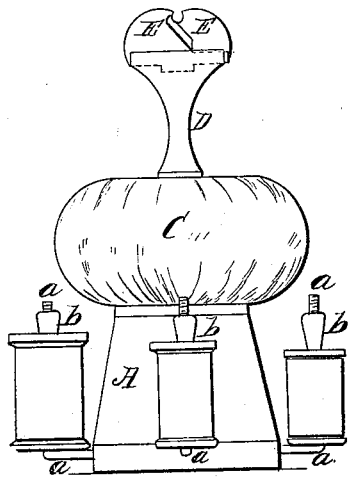
Figure 2:
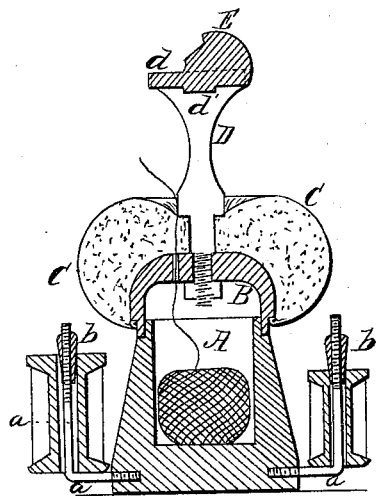

Figure 1 is an elevation,

Figure 2 a vertical section, and

Figure 3:
Figure 4:

Figures 3 and 4 are enlarged views of parts in detail.

The nature of my invention consists in so combining a number of articles of utility to the housekeeper as that they may form a pleasing ornament to the work-table, so simple in its details as to be of easy construction, and therefore of little expense.

In the drawing, A is a stand, of wood, metal, or other suitable material, of any form to please the fancy, and hollowed out so as to form a box or receptacle for a ball of twine or thread, or anything of that sort. B is a cap or cover, made to fit the stand A, as shown in fig. 2.

$a\ a$ are spindles, screwed into or otherwise firmly attached to the stand A, having screws cut upon their upper ends, upon which the spools are placed, and upon which they may revolve loosely. Conical nuts, $b\ b$, are tapped for the screws on the spindles, and their taper form allows them to be screwed down into the centre hole of any-sized spool as tight as may be desired, or so much as will prevent the spool from turning too freely. In fig. 2 are shown the positions of the nuts on different-sized spools.

C is a pin and needle-cushion, of material and form to suit the maker. A hem is made in the lower or outer edge of the cushion-cover, through which a cord is passed, so that, pulling on the ends, the cushion will be contracted like a purse. The cushion is placed over the cap or cover B, and the hemmed and corded edge is drawn to a groove or ledge around the cover, and contracted thereon by drawing the cord, which may then be secured by tying or otherwise fastening the ends. This is shown at $c$, fig. 2.

This method of attaching pin-cushions may be used on any kind of a stand or support for articles of a similar nature.

A hole through the cap B allows the twine or thread therein to be drawn out as required, after being passed through the cushion by a needle.

D is a metallic standard arising from the top of the cover B, to which it is secured by a screw and nut, or any equivalent device, after passing through the cushion, as shown in fig. 2. The top of this standard is grooved, to form a socket for the reception of the knives E E. Fig. 3 is an enlarged vertical cross-section of the head of the standard and knives on a line passing through the angle formed by their inclined edges, as shown in fig. 1. The knives are alike, and are both ground to a bevel edge on the same side, so that when their flat sides are in contact, their edges will form a cutting-angle, as shown.

The heel of each knife is prolonged into a bar, $d$, and has a projection, $d'$, in the centre, for about one-third of its length, for which there is a corresponding socket in the bottom of the groove in the standard D, the depth of this groove being a trifle more than the width of the bars $d$, while its width is equal to the thickness of both knives at their heels. The bar $d$ of each knife is slightly deflected or sprung from the plane of the flat side of the knife, as seen in fig. 4, which shows an edge view of the heels of the knives together, so that when placed together in the groove of the standard D, they will be compressed and tightly held by their tendency to spring apart, while the knives will be prevented from working apart by the projections $d'$ fitting into the socket in the bottom of the groove of the standard.

Having thus fully described my invention, what I claim as new therein, and desire to secure by Letters Patent, is—

1. The groove and socket of the standard D, in combination with the deflected bars $d\ d'$ of the knives E, substantially as and for the purpose set forth.

2. The spool-spindles *a a*, twine-box A B, pin-cushion C, and knives E, combined, arranged, and operating substantially as set forth.

In testimony that I claim the above-described "combined spool-rack, pin-cushion, and twine-box," I have hereunto signed my name, this     day of    , 186

I. MORRIS.

Witnesses:
 FINIS E. MORGAN,
 JAMES RONALD.